(12) United States Patent
Rubinstein et al.

(10) Patent No.: US 8,726,283 B1
(45) Date of Patent: May 13, 2014

(54) DEADLOCK AVOIDANCE SKID BUFFER

(75) Inventors: Oren Rubinstein, Sunnyvale, CA (US);
Dennis K. Ma, Austin, TX (US);
Richard B. Kujoth, Shaumburg, IL (US)

(73) Assignee: NVIDIA Corporation, Santa Clara, CA (US)

( * ) Notice: Subject to any disclaimer, the term of this patent is extended or adjusted under 35 U.S.C. 154(b) by 1821 days.

(21) Appl. No.: 11/757,655

(22) Filed: Jun. 4, 2007

(51) Int. Cl.
*G06F 9/455* (2006.01)
*G06F 9/46* (2006.01)

(52) U.S. Cl.
USPC ........................................... 718/102

(58) Field of Classification Search
None
See application file for complete search history.

(56) References Cited

U.S. PATENT DOCUMENTS

| | | | |
|---|---|---|---|
| 5,133,074 A * | 7/1992 | Chou | 711/146 |
| 5,784,649 A * | 7/1998 | Begur et al. | 710/52 |
| 5,943,242 A | 8/1999 | Vorbach et al. | |
| 6,021,490 A | 2/2000 | Vorbach et al. | |
| 6,081,883 A * | 6/2000 | Popelka et al. | 712/28 |
| 6,081,903 A | 6/2000 | Vorbach et al. | |
| 6,119,181 A | 9/2000 | Vorbach et al. | |
| 6,338,106 B1 | 1/2002 | Vorbach et al. | |
| 6,405,299 B1 | 6/2002 | Vorbach et al. | |
| 6,425,068 B1 | 7/2002 | Vorbach et al. | |
| 6,480,937 B1 | 11/2002 | Vorbach et al. | |
| 6,490,630 B1 * | 12/2002 | Poon et al. | 709/235 |
| 6,542,998 B1 | 4/2003 | Vorbach et al. | |
| 6,571,381 B1 | 5/2003 | Vorbach et al. | |
| 6,697,979 B1 | 2/2004 | Vorbach et al. | |
| 7,003,660 B2 | 2/2006 | Vorbach et al. | |
| 7,174,432 B2 * | 2/2007 | Howard et al. | 711/147 |
| 7,210,129 B2 | 4/2007 | May et al. | |
| 7,266,725 B2 | 9/2007 | Vorbach et al. | |
| 7,330,916 B1 * | 2/2008 | Kirk | 710/52 |
| 7,394,284 B2 | 7/2008 | Vorbach | |
| 7,434,191 B2 | 10/2008 | Vorbach et al. | |
| 7,444,531 B2 | 10/2008 | Vorbach et al. | |
| 2005/0055406 A1 * | 3/2005 | Singhai et al. | 709/206 |

\* cited by examiner

*Primary Examiner* — Corey S Faherty
(74) *Attorney, Agent, or Firm* — Patterson & Sheridan, LLP (57) ABSTRACT

Under some conditions, requests transmitted between different devices in a computing system may be blocked in a way that prevents the request from being processed, resulting in a deadlock condition. A skid buffer is used to allow additional requests to be queued in order to remove the blockage and end the deadlock condition. Once the deadlock condition is removed, the requests are processed and the additional buffer entries in the skid buffer are disabled.

20 Claims, 8 Drawing Sheets

DEADLOCK AVOIDANCE SKID BUFFER

BACKGROUND OF THE INVENTION

1. Field of the Invention

The present invention generally relates to avoid deadlock conditions between devices in a computing system and more specifically to removing a deadlock condition caused by queued requests that are transferred between devices in the computing system.

2. Description of the Related Art

Current processing systems use conventional interfaces, such as PCI Express and HyperTransport to communicate between devices within the system. These protocols specify rules for transmitting requests between the different devices in order to prevent deadlock conditions. In some cases, one or more of the devices in the system do not adhere to the rules, and requests between different devices are blocked in a way that prevents the request from being processed, resulting in a deadlock condition.

Accordingly, what is needed in the art is a system and method for ending the deadlock condition to allow request processing to resume.

SUMMARY OF THE INVENTION

Under some conditions, requests transmitted between different devices in a computing system may be blocked in a way that prevents the request from being processed, resulting in a deadlock condition. A skid buffer is used to allow additional requests to be queued in order to remove the blockage and end the deadlock condition. Once the deadlock condition is removed, the requests are processed and the additional buffer entries in the skid buffer are disabled.

Various embodiments of a method of the invention for avoiding deadlock during request processing include determining a deadlock condition exists that prevents processing of queued requests received from a processing unit, enabling additional entries to accept additional requests and remove the deadlock condition, processing the queued requests, and disabling the additional entries after the additional requests are output and the additional entries are empty.

Various embodiments of the invention include a system for avoiding deadlock during request processing. The system includes a processing unit configured to output requests to a skid buffer. The skid buffer includes an incoming request FIFO, skid FIFO entries, and a deadlock detection unit. The deadlock detection unit is configured to determine a deadlock condition exists that prevents queued requests received from the processing unit that are stored in the incoming request FIFO from being output, enable the skid FIFO entries to accept additional requests and remove the deadlock condition, and disable the skid FIFO entries after the additional requests are output from the skid FIFO entries to the incoming request FIFO and the skid FIFO entries are empty.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
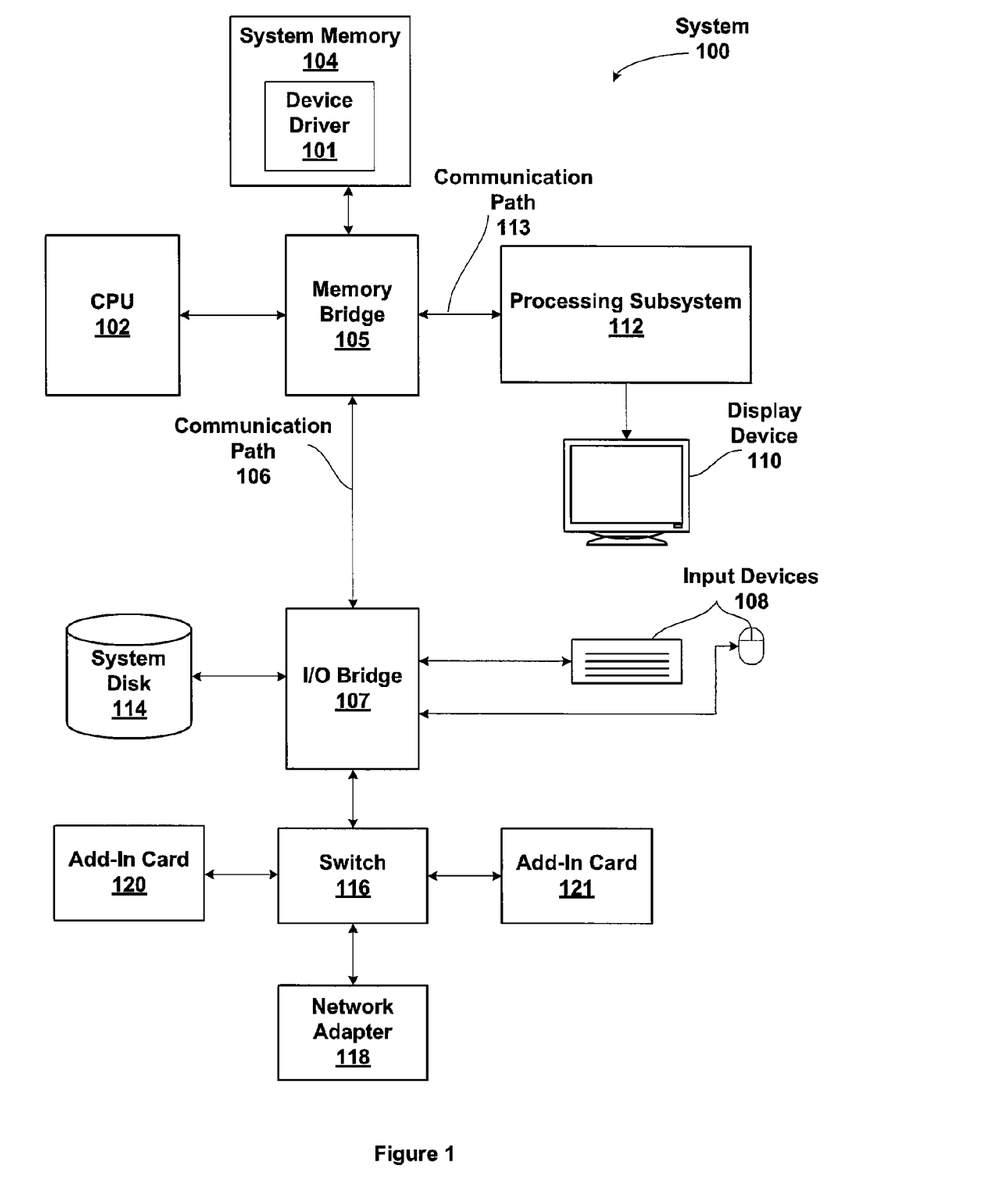
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105.

A processing subsystem 112 is coupled to memory bridge 105 via a bus or other communication path 113 (e.g., a PCI Express, Accelerated Graphics Port, or HyperTransport link); in one embodiment processing subsystem 112 is a graphics subsystem that delivers pixels to a display device 110 (e.g., a conventional CRT or LCD based monitor). Processing subsystem 112 may be implemented using one or more integrated circuit devices such as programmable processors, application specific integrated circuits (ASICs), and memory devices. Data and program instructions for execution by processing subsystem 112 may be stored in system memory 104 or memory within other devices of system 100. In embodiments of the present invention where processing subsystem 112 is a graphics subsystem, the instructions may be specified by an application programming interface (API) which may be a conventional graphics API such as Direct3D or OpenGL.

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Processing subsystem 112 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. Processing subsystem 112 may transfer data from system memory 104 into internal (on-chip) memory, process the data, and write result data back to system memory 104, where such data can be accessed by other system components, including, e.g., CPU 102 or another processing subsystem 112.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of processing subsystem 112 to the rest of system 100 may also be varied. In some embodiments, processing subsystem 112 is implemented as an add-in card that can be inserted into an expansion slot of system 100. In other embodiments, a processing subsystem 112 is integrated on a single chip with a bus bridge, such as memory bridge 105 or I/O bridge 107. In still other embodiments, some or all elements of processing subsystem 112 are integrated on a single chip with CPU 102.

A processing subsystem 112 may include any amount of local memory, including no local memory, and may use local memory and system memory 104 in any combination. For instance, processing subsystem 112 can be a graphics processor in a unified memory architecture (UMA) embodiment; in such embodiments, little or no dedicated graphics (local) memory is provided, and processing subsystem 112 uses system memory 105 exclusively or almost exclusively. In UMA embodiments, processing subsystem 112 may be integrated into a bridge chip or processor chip or provided as a discrete chip with a high-speed link (e.g., PCI-E) connecting processing subsystem 112 to system memory, e.g., via a bridge chip.

Furthermore, any number of processing subsystem 112 can be included in system 110 to create a parallel processing subsystem. For instance, multiple processing subsystem 112 can be provided on a single add-in card, or multiple add-in cards can be connected to communication path 113, or one or more of the processing subsystems 112 can be integrated into a bridge chip. The processing subsystems 112 in a parallel processing subsystem may be identical to or different from each other; for instance, different processing subsystems 112 may have different numbers of cores, different amounts of local memory, and so on. Where multiple processing subsystems 112 are present, they can be operated in parallel to process data at higher throughput than is possible with a single processing subsystem 112. Systems incorporating one or more processing subsystems 112 may be implemented in a variety of configurations and form factors, including desktop, laptop, or handheld personal computers, servers, workstations, game consoles, embedded systems, and so on.

Deadlock Condition

Under some conditions, requests transmitted via communication paths between different devices in a system 100 may be blocked in a way that prevents the request from being processed, resulting in a deadlock condition. When deadlock occurs, no requests are processed and one or more devices in system 100 are unable to continue processing data. A skid buffer is used to allow additional requests to be queued by enabling additional buffer entries in order to end the deadlock condition. Once the deadlock condition is removed, the requests are processed and the additional buffer entries in the skid buffer are disabled.

Figure 2A:
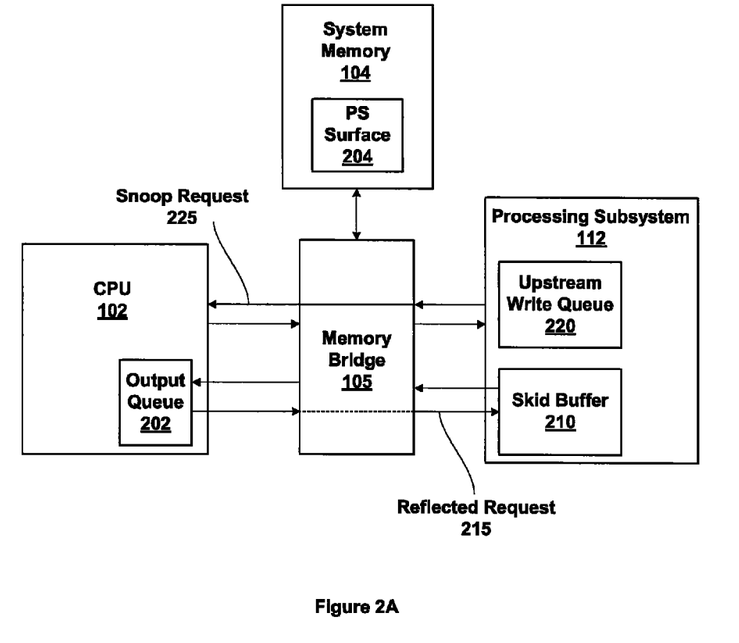
FIG. 2A is a block diagram of a portion of the computer system of FIG. 1 in accordance with one or more aspects of the present invention.

FIG. 2A is a block diagram of a portion of system 100 of FIG. 1, in accordance with one or more aspects of the present invention. A PS (processing subsystem) surface 204 is stored in system memory 104. PS surface 204 is a portion of memory that is allocated to processing subsystem 112 and may be used to store program instructions, input data, image data, e.g., frame buffer, texture maps, or the like. Processing subsystem 112 may reorganize the addresses within PS surface 204 to improve the memory bandwidth utilization between system memory 104 and processing subsystem 112. For example, when processing subsystem 112 is a graphics processor and PS surface 204 is a frame buffer or texture map, data stored in PS surface 204 may be stored in an interleaved order rather than in a linear order to improve two-dimensional locality.

Since the organization of addresses is not known to devices other than processing subsystem 112, any requests to read or write PS surface 204 received by memory bridge 105 from CPU 102 are reflected to processing subsystem 112 before being output to system memory 104. The reflection operation translates the request address as needed to properly access PS surface 204. The reflection operation can cause a deadlock condition to occur when the CPU 102 is attempting to output an EOI (end of interrupt) transaction to a device via memory bridge 105.

CPU 102 includes an output queue 202 that stores outgoing requests, including EOIs for output by CPU 102. In particular, write requests from CPU 102 to system memory 104 are output to memory bridge 105. Any write requests to PS surface 204, are reflected to processing subsystem 112, via write request 215. Processing subsystem 112 includes a skid buffer 210 and an upstream write queue 220. Incoming write requests, including reflected requests are stored in skid buffer 210, as described in conjunction with FIG. 3A, for processing by processing subsystem 112. Reflected requests are output back to memory bridge 105 via upstream write queue 220 with the address translation information that is needed to complete the request. In addition to the reflected requests, processing subsystem 112 produces snoop requests when the request being output may be cached by CPU 102. The snoop request output by memory bridge 105 to CPU 102 is snoop request 225 and it ensures that any data cached by CPU 102 is flushed to system memory 104. Under certain conditions a snoop request from a conventional processing unit may be blocked at the input to CPU 102 and if the conventional processing unit blocks inputs from CPU 102, deadlock can occur, as described in conjunction with FIG. 2B. By using skid buffer 210 in processing subsystem 112 the deadlock condition may be removed, as described in conjunction with FIGS. 4A and 4B.

Figure 2B:
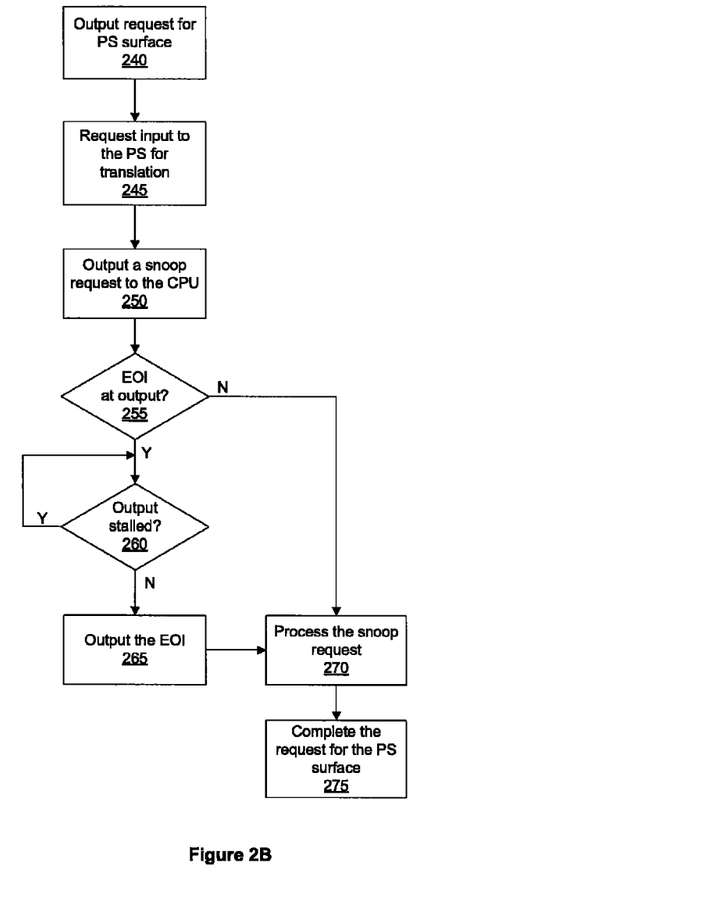
FIG. 2B is a flow diagram of method steps for processing a request using a processing unit without a skid buffer.

FIG. 2B is a flow diagram of method steps for processing a request for PS surface 204 without using skid buffer 210. In step 240 CPU 102 outputs a request for PS surface 204. In step 245 memory bridge 105 passes (reflects) the request to processing subsystem 112 for address translation via write request 215. In step 250 processing subsystem 112 outputs a snoop request to memory bridge 105. Note that the snoop request may be output several clock cycles after the reflected request is received by processing subsystem 112 due to propagate delays incurred as the reflected request passes through skid buffer and causes generation of the snoop request. As the reflected request propagates through processing subsystem 112, additional reflected requests may be received by processing subsystem 112 and stored in skid buffer 210 and upstream write queue 220.

In step 255 CPU 102 determines if an EOI is ready for output by CPU 102 to memory bridge 105, and, if not, the method proceeds to step 270. Otherwise, in step 260 CPU 102 determines if the output interface to memory bridge 105 is stalled, preventing CPU 102 from outputting the EOI. If, in step 260, CPU 102 determines that the output is not stalled, then in step 265 CPU 102 outputs the EOI to memory bridge 105. In step 270 CPU 102 receives the snoop request from memory bridge 105 via snoop request 225 and processes the snoop request. The snoop request returns an acknowledgement to memory bridge 105 that indicates that the request can proceed.

When the snoop request address is not in a cache within CPU 102, then the acknowledgement is output quickly. When the snoop request address is in a cache, but has not been modified, the acknowledgement is also output quickly. When the snoop request indicates that the request is a write, the cache line matching the address is invalidated since the content will be stale and the acknowledgement is output. When the snoop request address is cached in CPU 102 and is dirty, i.e., has been modified, CPU 102 first flushes the cache line to write the data back to system memory 104 and then outputs the acknowledgement.

In step 275 memory bridge 105 completes the request to access PS surface 204. If, in step 260, CPU 102 determines that the output is stalled, then CPU 102 repeats step 260 until the output is no longer stalled. Under some circumstances, the output remains stalled and a deadlock condition exists for the output of CPU 102 and the output of processing subsystem 112. In particular, when CPU 102 has an EOI at the output and is stalled, CPU 102 cannot write a cache line to system memory 104 and acknowledge a snoop request via snoop request 225 when the snoop request address is cached and dirty. If processing subsystem 112 has output a snoop request to CPU 102 for an address is cached and dirty, the system is deadlocked and skid buffer 210 functions to eliminate the stall at the output of CPU 102 to remove the deadlock condition.

Figure 3A:
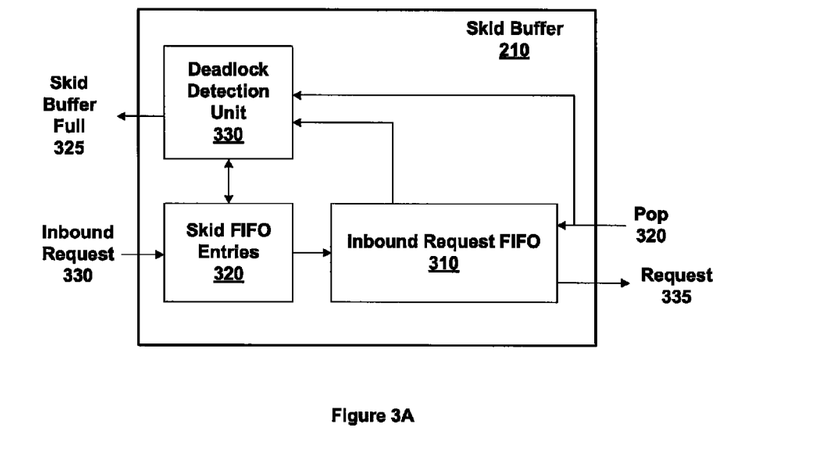
FIG. 3A is a block diagram of the skid buffer of FIG. 2A in accordance with one or more aspects of the present invention.

FIG. 3A is a block diagram of skid buffer 210 of FIG. 2A, in accordance with one or more aspects of the present invention. Skid buffer 210 includes a deadlock detection unit 330, skid FIFO (first-in first-out memory) entries 320, and inbound request FIFO 310. Inbound requests from memory bridge 105 are received at an inbound request 330 input and requests are output to other units within processing subsystem 110 by request 335 output. When skid buffer 210 cannot accept new requests at inbound request 330, skid buffer full 325 is asserted. Requests are removed from skid buffer by asserting a pop 320 input.

Under normal conditions, i.e., when a deadlock condition does not exist, new requests received at inbound request 330 are pushed directly into inbound request FIFO 310 and are not stored in skid FIFO entries 320. When a deadlock condition is detected by deadlock detection unit 330, skid FIFO entries 320 are enabled and new requests received at inbound request 330 are pushed into skid FIFO entries 320 and pushed into inbound request FIFO 310 as they are popped from skid FIFO entries 320. Deadlock detection unit 330 determines that a deadlock condition exists when a valid inbound request is provided at inbound request 330, pop 320 is negated, and inbound request FIFO 310 is full, causing skid buffer full 325 to be asserted for a predetermined number of cycles, as described in conjunction with FIG. 4A. Once the requests stored in skid FIFO entries 320 are all pushed into inbound request FIFO 310, deadlock detection unit 330 disabled skid FIFO entries 320 and normal operation resumes.

Figure 3B:
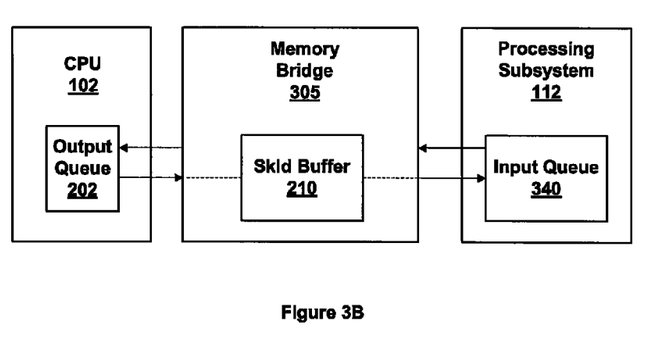
FIG. 3B is a block diagram of a memory bridge including the skid buffer of FIG. 3A in accordance with one or more aspects of the present invention.

As shown in FIG. 2A, skid buffer 210 is positioned in processing subsystem 112. In other embodiments of the present invention, skid buffer 210 is positioned in memory bridge 105 or any other device along the request path between CPU 102 and processing subsystem 112. FIG. 3B is a block diagram of a memory bridge 305 that includes skid buffer 210, in accordance with one or more aspects of the present invention. Memory bridge 305 receives requests (and EOI transactions) from output queue 202 of CPU 102. Skid buffer 210 enables skid FIFO entries 320 when a deadlock condition is detected and negates the stall output from memory bridge 305 to CPU 102 to accept new inputs from output queue 202. When skid buffer 210 is positioned in memory bridge 105, it is not necessary to also include a skid buffer 210 in processing subsystem 112. Therefore, processing subsystem 112 can instead use a conventional input queue 340, such as a FIFO instead of skid buffer 210.

Figure 4A:
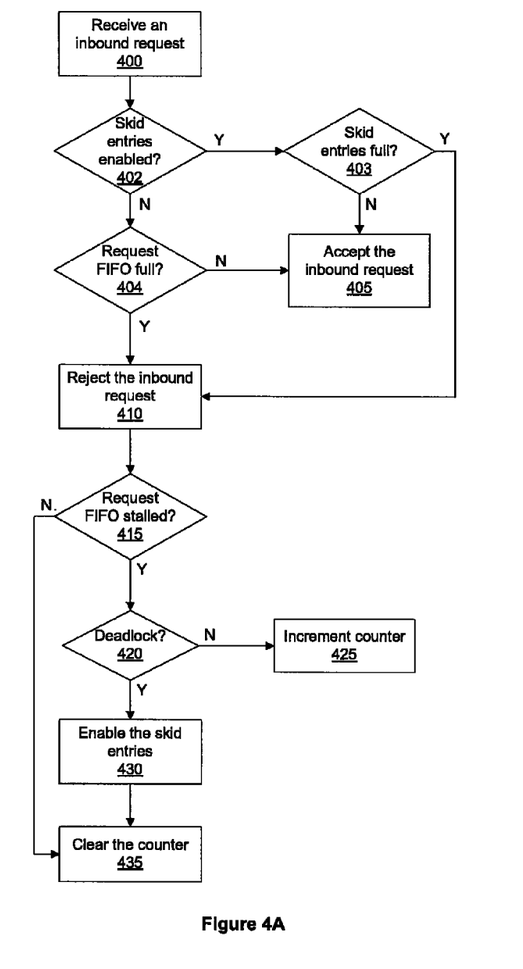
FIG. 4A is a flow diagram of method steps for processing a request received by the skid buffer in accordance with one or more aspects of the present invention.

FIG. 4A is a flow diagram of method steps for processing a request received by skid buffer 210, in accordance with one or more aspects of the present invention. In step 400 skid buffer 210 receives an inbound request. In step 402 skid buffer 210 determines if the additional entries in skid FIFO entries 320 are enabled. If, in step 402, skid buffer 210 determines that the additional entries are enabled, then in step 403 deadlock detection unit 330 determines if skid FIFO entries 320 are full. If, in step 403, skid FIFO entries 320 are not full, then in step 405 deadlock detection unit 330 negates skid buffer full 325 and accepts inbound request 330 for storage in skid FIFO entries 320.

If, in step 403 deadlock detection unit 330 determines that skid FIFO entries 320 are full, then in step 410 deadlock detection unit 330 asserts skid buffer full 325 and rejects inbound request 330 for storage in skid FIFO entries 320. Skid FIFO entries 320 should be a number of entries that is sufficient to end a deadlock condition and allow a previously blocked inbound request to be accepted by skid buffer 210. Returning to step 402, if skid buffer 210 determines that the additional entries are not enabled, then in step 404 deadlock detection unit 330 determines if inbound request FIFO 310 is full. If, in step 404, inbound request FIFO 310 is not full, then in step 405 deadlock detection unit 330 negates skid buffer full 325 and accepts inbound request 330 for storage in inbound request FIFO 310. When skid FIFO entries 320 are not enabled, inbound request 330 passes through skid FIFO entries 320 (or bypasses skid FIFO entries 320), and is stored directly in inbound request FIFO 310. If, in step 404, inbound request FIFO 310 is full, then in step 405 deadlock detection unit 330 asserts skid buffer full 325 and rejects inbound request 330 for storage in inbound request FIFO 310.

In step 415 deadlock detection unit 330 determines if inbound request FIFO 310 is stalled, i.e., if pop 320 is negated, blocking request 335 from being output. If, in step 415 deadlock detection unit 330 determines that inbound request FIFO 310 is not stalled, then in step 435 deadlock detection unit 330 clears the deadlock counter. If, in step 415 deadlock detection unit 330 determines that inbound request FIFO 310 is stalled, then in step 420, deadlock detection unit 330 determines the deadlock counter has reached a limit, meaning that skid buffer has not accepted an inbound request since inbound request FIFO 310 is full and has been stalled for a predetermined number of cycles, indicating that a deadlock condition may exist. The limit may be a programmed value or a static value. In some embodiments of the present invention, different counters are used to monitor different possible deadlock conditions and in step 420 deadlock detection unit 330 determines if any one of the deadlock counters has reached a corresponding limit.

If, in step 420, deadlock detection unit 330 determines that the deadlock counter has not reached the limit, then in step 425 deadlock detection unit 330 increments the deadlock counter. Otherwise, in step 430 deadlock detection unit 330 enables skid FIFO entries 320 in order to remove the deadlock condition. The additional entries provided by skid FIFO entries 320 are enabled until deadlock detection unit 330 disables those entries, as described in conjunction with FIG. 4B. In step 435 deadlock detection unit 330 clears the deadlock counter.

Figure 4B:
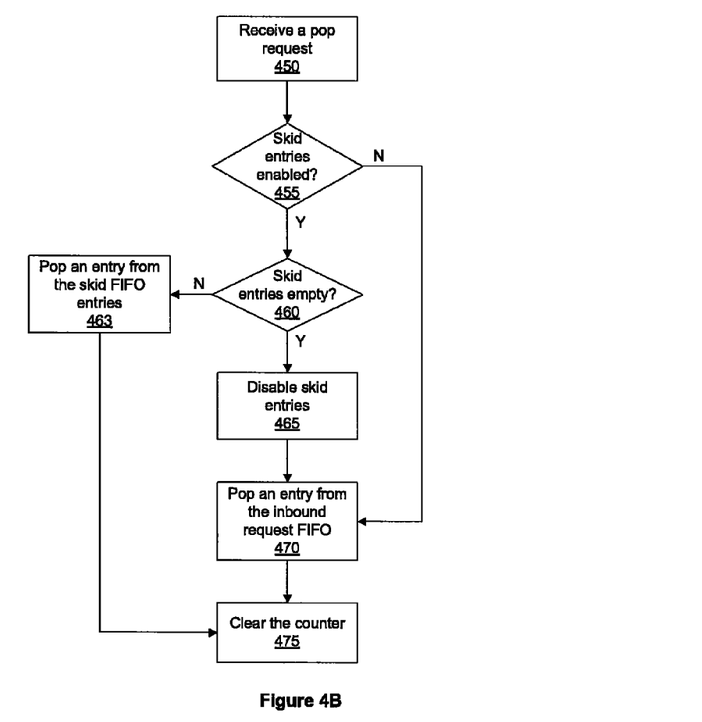
FIG. 4B is a flow diagram of method steps for outputting a request from the skid buffer in accordance with one or more aspects of the present invention.

FIG. 4B is a flow diagram of method steps for outputting a request from skid buffer 210, in accordance with one or more aspects of the present invention. In step 450 skid buffer 210 receives a pop request via pop 320. In step 455 deadlock detection unit 330 determines if skid FIFO entries 320 are enabled, and, if not, deadlock detection unit 330 proceeds directly to step 470 and pops an entry from inbound request FIFO 310. Otherwise, in step 460 deadlock detection unit 330 determines if skid FIFO entries 320 are empty, and, if not, deadlock detection unit 330 proceeds to step 463 and pops an entry from skid FIFO entries 320. Otherwise, when skid FIFO entries 320 is enabled and empty, in step 465 deadlock detection unit 330 disables skid FIFO entries 320 and then in step 470 and pops an entry from inbound request FIFO 310. In step 475 deadlock detection unit 330 clears the deadlock counter since a deadlock condition does not exist.

Figure 5:
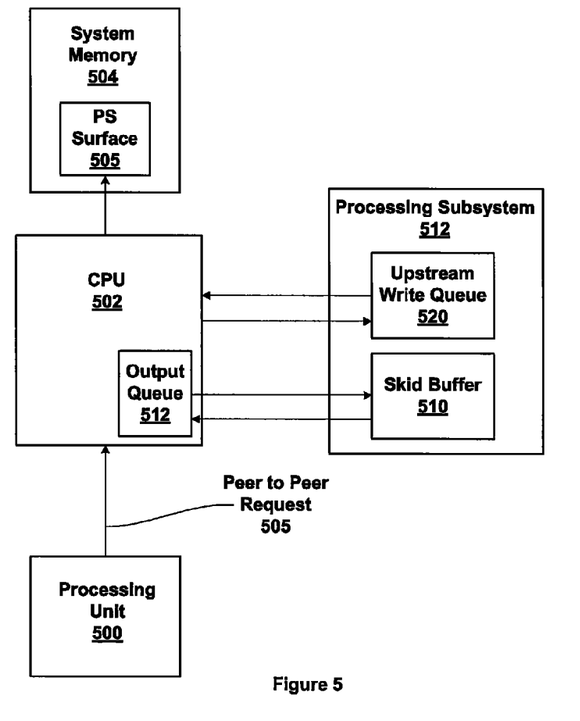
FIG. 5 is another block diagram of a portion of a computer system in accordance with one or more aspects of the present invention.

FIG. 5 is another block diagram of a portion of a system including a processing subsystem 512 with a skid buffer 510, in accordance with one or more aspects of the present invention. Rather than using a discrete memory bridge device, such as memory bridge 105 as shown in FIG. 1, CPU 502 includes the functions of a memory bridge and interfaces directly with system memory 504 and processing subsystem 512. Reflected requests from CPU 502 to PS surface 505 that pass through processing subsystem 512 may deadlock when CPU 502 has an EOI for output and processing subsystem 512 has a pending snoop request for output by upstream write queue 520. Therefore, skid buffer 510 is needed to remove the deadlock condition and allow CPU 502 and processing subsystem 512 to resume processing requests.

When a processing unit 500 initiates peer-to-peer communications with processing subsystem 512 a deadlock condition may result. Therefore, skid buffer 510 is also used to remove that deadlock condition and allow CPU 520, processing unit 500 and processing subsystem 512 to process peer-to-peer requests. In some embodiments of the present invention, processing unit 500 is a video engine that produces write requests for PS surface 505. The write requests for PS surface 505 are reflected by CPU 502 to processing subsystem 512 for address translation. When a snoop request from processing subsystem 512 is blocked by CPU 502 and processing subsystem 512 blocks additional requests from output queue 512 a deadlock condition results. Processing subsystem 512 may block requests from output queue 512 when upstream write queue 520 and the inbound request FIFO within skid buffer 510 is full. When the deadlock condition results, the additional entries provided by the skid FIFO entries within skid buffer 510 are enabled and the deadlock condition is removed.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for avoiding deadlock during request processing, comprising:
   determining a deadlock condition exists that prevents processing of queued requests received from a first processing unit, wherein the first processing unit is configured to reflect requests that access an addressable location in a system memory to a second processing unit to produce at least a portion of the queued requests, wherein the first processing unit receives address translation information for the requests from the second processing unit;
   enabling additional entries to accept additional requests from the first processing unit and remove the deadlock condition;
   processing the queued requests; and
   disabling the additional entries after the additional requests are output from the additional entries and the additional entries are empty.

2. The method of claim 1, wherein locations in the system memory are mapped to addresses that are allocated to and reorganized by the second processing unit.

3. The method of claim 1, wherein the deadlock condition exists when the first processing unit blocks a queued request from the second processing unit.

4. The method of claim 3, wherein the queued request is a snoop request that is output to the first processing unit to update any cached data for the addressable location in the system memory that is stored in the first processing unit.

5. The method of claim 1, wherein the deadlock condition exists when the first processing unit is blocked from outputting an end of interrupt transaction.

6. The method of claim 1, wherein the additional entries are located in a memory bridge device that stores a portion of the queued requests and interfaces between the first processing unit, the system memory, and the second processing unit.

7. The method of claim 1, wherein the second processing unit is configured to process graphics data and store processed graphics data in a portion of a system memory that is allocated to the second processing unit and accessible by the first processing unit.

8. The method of claim 1, further comprising completing the requests that access an addressable location in the system memory using the address translation information received from the second processing unit.

9. The method of claim 1, further comprising determining that the deadlock condition exists when a deadlock counter has reached a limit indicating that a inbound request FIFO is full and has been stalled for a predetermined number of cycles.

10. A method for avoiding deadlock during request processing, comprising:
   determining a deadlock condition exists that prevents processing of queued requests received from a first processing unit, wherein the deadlock condition exists when a video processing unit outputs a peer-to-peer request that accesses an addressable location in a system memory to the first processing unit and the peer-to-peer request is reflected by the first processing unit to a graphics processor for address translation;
   enabling additional entries to accept additional requests from the first processing unit and remove the deadlock condition;
   processing the queued requests; and
   disabling the additional entries after the additional requests are output from the additional entries and the additional entries are empty.

11. A system for avoiding deadlock during request processing, comprising:
   a first processing unit configured to output requests; and
   a skid buffer coupled to the first processing unit and configured to receive the requests, the skid buffer comprising:
      an incoming request FIFO configured to store queued requests received from the first processing unit;
      skid FIFO entries coupled to the incoming request FIFO and configured to store additional requests received from the first processing unit and output the additional requests to the incoming request FIFO; and
      a deadlock detection unit coupled to the incoming request FIFO and the skid FIFO entries and configured to determine a deadlock condition exists that prevents the queued requests from being output, enable the skid FIFO entries to accept the additional requests and remove the deadlock condition, and disable the skid FIFO entries after the additional requests are output from the skid FIFO entries to the incoming request FIFO and the skid FIFO entries are empty.

12. The system of claim 11, further comprising a system memory coupled to the first processing unit and configured to store data in addressable locations that are allocated to and organized by a second processing unit and accessible by the processing unit.

13. The system of claim 12, further comprising a memory bridge device that is coupled between the first processing, the second processing unit, and the system memory.

14. The system of claim 13, wherein the skid buffer is included within the memory bridge device.

15. The system of claim 13, wherein the memory bridge device is configured to reflect an output request received from the first processing unit to the second processing unit when the output request accesses an addressable location in the system memory that is allocated to and organized by the second processing unit.

16. The system of claim 13, wherein the deadlock condition exists when the first processing unit blocks a request for output by the second processing unit through the memory bridge device to the first processing unit.

17. The system of claim 12, wherein the second processing unit is configured to process graphics data and store processed graphics data in the addressable locations of the system memory.

18. The system of claim 12, wherein the skid buffer is included within the second processing unit.

19. The system of claim 11, further comprising a third processing unit that is coupled to the first processing unit and the first processing unit is configured to reflect an output request received from the third processing unit to the second processing unit when the output request accesses an addressable location in the system memory that is allocated to and organized by the second processing unit.

20. The system of claim 19, wherein the deadlock condition exists when the first processing unit blocks a request for output by the second processing unit to the first processing unit.

* * * * *

UNITED STATES PATENT AND TRADEMARK OFFICE
CERTIFICATE OF CORRECTION

| | | |
|---|---|---|
| PATENT NO. | : 8,726,283 B1 | Page 1 of 1 |
| APPLICATION NO. | : 11/757655 | |
| DATED | : May 13, 2014 | |
| INVENTOR(S) | : Rubinstein et al. | |

It is certified that error appears in the above-identified patent and that said Letters Patent is hereby corrected as shown below:

On the Title Page, Inventors item (75):

Please delete "Shaumburg" and insert -- Schaumburg -- therefor.

Signed and Sealed this
Twelfth Day of August, 2014

Michelle K. Lee
*Deputy Director of the United States Patent and Trademark Office*